(12) United States Patent
Kim

(10) Patent No.: US 7,794,872 B2
(45) Date of Patent: Sep. 14, 2010

(54) SECONDARY BATTERY

(75) Inventor: Yong-Sam Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1092 days.

(21) Appl. No.: 11/036,933

(22) Filed: Jan. 14, 2005

(65) Prior Publication Data

US 2005/0202319 A1  Sep. 15, 2005

(30) Foreign Application Priority Data

Feb. 16, 2004 (KR) ............. 10-2004-0010044

(51) Int. Cl.
*H01M 2/26* (2006.01)
(52) U.S. Cl. .................. 429/161; 429/211
(58) Field of Classification Search ............... 429/161, 429/211
See application file for complete search history.

(56) References Cited

U.S. PATENT DOCUMENTS

| | | | | |
|---|---|---|---|---|
| 3,393,095 A | * | 7/1968 | Philipp | 429/161 X |
| 3,732,124 A | * | 5/1973 | Cailley | 429/161 X |
| 4,255,500 A | * | 3/1981 | Hooke | 429/94 |
| 4,529,675 A | * | 7/1985 | Sugalski | 429/94 |
| 5,958,088 A | * | 9/1999 | Vu et al. | 429/94 X |
| 6,156,452 A | * | 12/2000 | Kozuki et al. | 429/211 |
| 6,818,025 B1 | * | 11/2004 | Ura | 429/161 X |
| 7,157,181 B2 | * | 1/2007 | Wiepen | 429/161 |
| 7,273,678 B2 | * | 9/2007 | Akita et al. | 429/211 |
| 7,335,442 B2 | * | 2/2008 | Nakanishi et al. | 429/161 |

FOREIGN PATENT DOCUMENTS

| | | |
|---|---|---|
| JP | 6-267528 | 9/1994 |
| JP | 11-233148 | 8/1999 |
| JP | 2000-058038 | 2/2000 |
| JP | 2000-268846 | 9/2000 |
| JP | 2001-160387 | 6/2001 |
| JP | 2003-203620 | 7/2003 |
| JP | 2003-272599 | 9/2003 |
| JP | 2003-272600 | 9/2003 |

(Continued)

OTHER PUBLICATIONS

Patent Abstract of Japan, Publication 06-297528, Published Sep. 22, 1994, for Kashiwabara.

(Continued)

*Primary Examiner*—Stephen J. Kalafut
(74) *Attorney, Agent, or Firm*—Christie, Parker & Hale, LLP

(57) ABSTRACT

A secondary battery includes an electrode assembly having a separator interposed between a positive plate and a negative plate. Each of the positive and negative plates has a portion that is not coated with active material. The uncoated regions of the positive and negative plates are respectively fixed to positive and negative collector plates by welding. A plurality of first weld lines are formed on the positive collector plate at predetermined angles from one another. A plurality of second weld lines are formed on the negative collector plate also at predetermined angles from one another. The plurality of first weld lines and the plurality of second weld lines are offset from one another.

19 Claims, 4 Drawing Sheets

FOREIGN PATENT DOCUMENTS

WO     WO 03/077332   *   9/2003

OTHER PUBLICATIONS

Patent Abstract of Japan, Publication 11-233148, Published Aug. 27, 1999, for Shigetomi.

Patent Abstracts of Japan, Publication No. 2003-272599, dated Sep. 26, 2003, in the name of Hiroyuki Akaita, et al.

Patent Abstracts of Japan for Publication No. 2001-160387; Date of publication of application Jun. 12, 2001, in the name of Koichi Sato et al.

* cited by examiner

SECONDARY BATTERY

CROSS-REFERENCE TO RELATED APPLICATION

This application claims the benefit of and priority to Korean Patent Application No. 10-2004-0010044 filed Feb. 16, 2004 in the Korean Intellectual Property Office, the entire disclosure of which is incorporated herein by reference.

FIELD OF THE INVENTION

The present invention relates to a secondary battery, and more particularly, to an electrode assembly comprising a positive plate, a negative plate and collector plates electrically connected to the positive and negative plates.

BACKGROUND OF THE INVENTION

Unlike a primary battery, a secondary battery may be recharged. Common types of secondary batteries may be made into battery packs and used as the power source for various portable electronic devices such as cellular phones, laptop computers, and camcorders. Lithium secondary batteries are suitable for portable electronic devices since they have high driving voltage and high energy density per unit weight.

Depending on the external shape, secondary batteries may be classified into different types such as square and cylindrical batteries. A cylindrical-shaped secondary battery generally includes an electrode assembly in which a positive plate and a negative plate and a separator as an insulator interposed therebetween are spiral-wound in a "jelly-roll" configuration. The electrode assembly is inserted inside a cylindrical container to form the battery.

The positive and negative plates have lead terminals, that is, conductive tabs which collect the current produced from the positive and negative plates. The conductive tab is fixed to the corresponding positive or negative plate such as by welding, to induce the current from the positive and negative plates to the positive and negative terminals of the battery.

Such a structure achieves sufficient collecting efficiency when used for a small battery with a low electric capacity. However, for a large battery that needs higher power, the area of the positive and negative plates must be increased with the increasing size of the battery, and accordingly, the resistance is increased. Therefore, the collecting efficiency for a battery using a conductive tab decreases.

In an effort to overcome these difficulties, there have been provided secondary batteries including the battery disclosed in Japanese laid-open No. 11-233148 which have plural tabs to better induce the current from each of the positive and negative plates.

Such secondary batteries can improve the collecting efficiency by fixing several lead tabs to each of the positive and negative plates to decrease the internal resistance of these batteries.

In addition, Japanese laid-open No. 6-267528 discloses a secondary battery in which a lead installing member of a long belt shape that is not coated with the active material is provided for each of the collectors of the positive and negative plates, and plural leads are welded at the lead installing member.

Such a secondary battery also has a structure such that several leads are fixed to the lead installing member. This can improve the collecting efficiency by collecting the current from the positive and negative plates with less internal resistance.

However, since the above battery requires plural leads fixed to the positive and negative electrodes, the manufacturing efficiency is low.

Furthermore, since the above batteries use spot welding to fix the lead tabs to the positive and negative plates and the collectors of the positive and negative plates are thin plates, the lead fixing regions may not maintain their shapes due to the pressure applied to the lead fixing regions, and, accordingly, it makes the welding difficult.

SUMMARY OF THE INVENTION

A secondary battery is provided in which the collecting efficiency for each of the positive and negative plates is improved. Furthermore, the collecting members which collect the current from the positive and negative plates can be easily fixed to the positive and negative plates.

According to one aspect of the present invention, a secondary battery includes an electrode assembly having a separator interposed between a positive plate and a negative plate. Each of the positive and negative plates has an uncoated region which is formed on at least a part of the plate thereof and which is not coated with active material. The uncoated regions of the positive and negative plates are respectively fixed to positive and negative collector plates by welding. A plurality of first weld lines placed with a first predetermined angle are formed on the positive collector plate, and a plurality of second weld lines placed with a second predetermined angle are formed on the negative collector plate. Though the positive and negative collector plates are generally spaced from one another, in one embodiment, the first and second weld lines are offset from one another.

The first weld lines can be arranged in a cross shape as can the second weld lines.

The angle formed between one of the first weld lines and an adjacent of the first weld lines can be 90 degrees.

Similarly, the angle formed between one of the second weld lines and an adjacent of the second weld lines can also be 90 degrees.

According to another aspect of the present invention, a secondary battery includes an electrode assembly having a separator interposed between a positive plate and a negative plate. Each of the positive and negative plates has an uncoated region which is formed on at least a part of a plate thereof and which is left uncoated with an active material. The uncoated regions of the positive and negative plates are respectively fixed to positive and negative collector plates by welding. When the positive weld line or lines formed on the positive collector plate are superimposed upon the negative weld line or lines formed on the negative collector plate, the corresponding positive and negative weld lines do not directly overlap, but instead intersect with each other forming a predetermined offset angle. Where two pairs of perpendicular weld lines are provided on each of the positive and negative collector plates, the offset angle is generally between about 10 and 80 degrees, and it is preferably about 45 degrees.

In yet another variation on such an embodiment, if a single positive weld line and a single negative weld line are provided, the offset angle is selected such that the positive weld line and the negative weld line are arranged in a cross shape, preferably at 90 degrees from one another.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION

Figure 1:
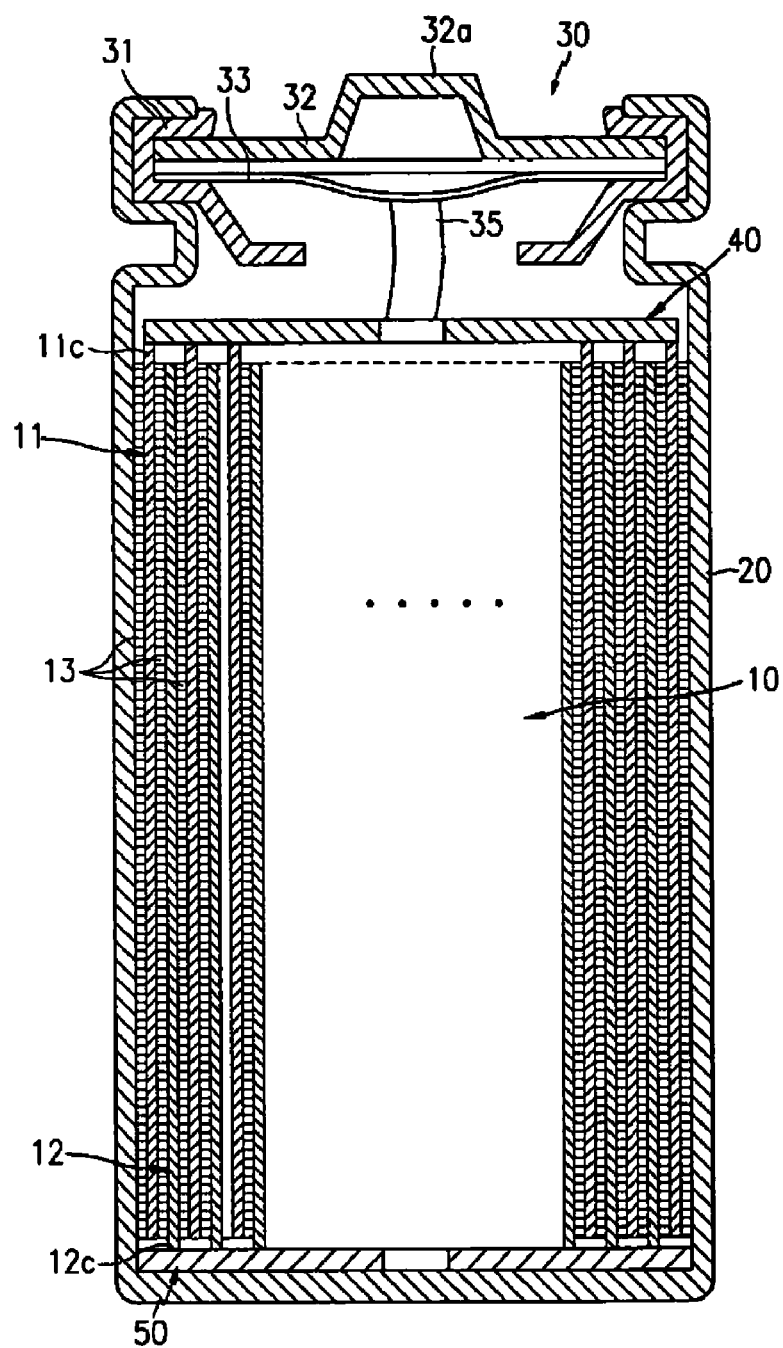
FIG. 1 is a cross-sectional view of a secondary battery according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a cross-sectional view of a secondary battery according to an embodiment of the present invention.

As shown in FIG. 1, the secondary battery includes an electrode assembly 10 having a positive plate 11, a negative plate 12 and a separator 13 interposed between the two plates. A container 20 having an opening formed on one of its ends receives the electrode assembly 10 and an electrolyte. A cap assembly 30 is mounted to an upper end of the opening of the container 20 with a gasket 31 thereby closing off and sealing the container 20. A positive collector plate 40 is connected to and in electrical contact with the positive plate 11 of the electrode assembly 10 and a negative collector plate 50 is connected to and in electrical contact with the negative plate 12 of the electrode assembly 10.

More specifically, the container 20 is made of conductive metal or alloy such as aluminum, aluminum alloy, or steel plated with nickel. According to the embodiment illustrated, it has a cylindrical shape defining a cylindrical inner space for receiving the electrode assembly 10.

Although the secondary battery explained in the exemplary embodiment has a cylindrical shape, its shape is not so limited and can be of another shape, for example, square.

Figure 2:
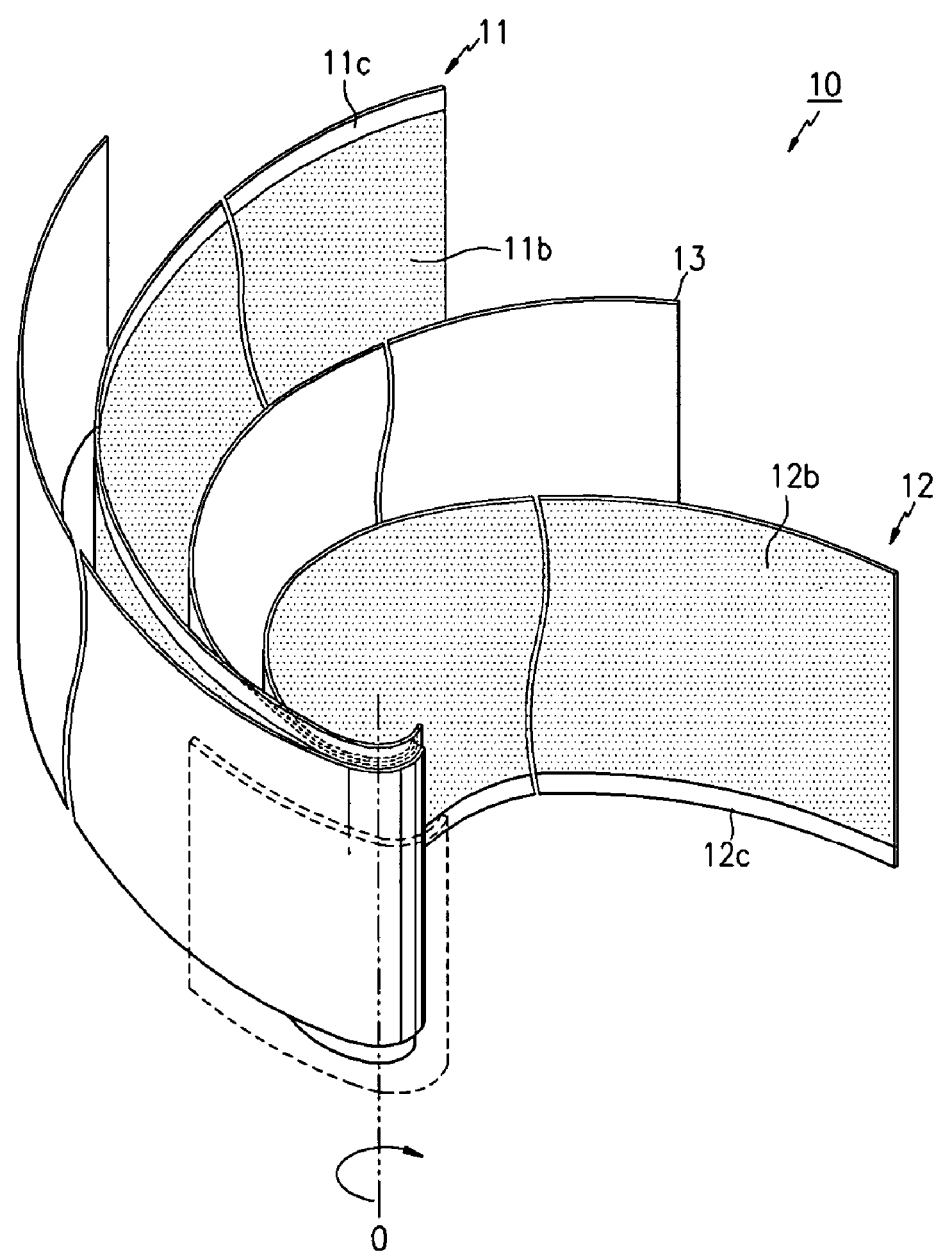
FIG. 2 is schematic exploded perspective view of an electrode assembly according to the embodiment of the present invention.

The electrode assembly 10 has a layered structure such that the separator 13 is placed between the positive plate 11 and the negative plate 12. Such an assembly can be stacked in a layered configuration, or can be wound into a jellyroll structure such as is shown in FIG. 2.

According to FIG. 1, the collector plates 40, 50 of the electrode assembly 10 are electrically connected to the positive plate 11 and the negative plate 12, respectively, to form an electrode assembly. According to FIG. 2, while the majority of the negative plate includes a coated region 12b coated with negative active material, a lower uncoated region 12c is provided which is not coated with the negative active material to provide an area for electrical contact with the negative collector plate 40. Similarly, while the majority of the positive plate includes a coated region 11b coated with positive active material, an upper uncoated region 11c is provided which is not coated with the positive active material to provide an area for electrical contact with the positive collector plate 40.

Referring to FIG. 1, the cap assembly 30 includes a cap plate 32 having an external terminal 32a, and a gasket 31 which insulates the cap plate 32 from the container 20. It can further include a vent plate 33 which is broken at a prescribed pressure level to discharge any gas upon a high pressure condition, thereby preventing the explosion of the battery. The vent plate 33 is electrically connected to the positive collector plate 40 through a lead 35.

The vent plate 33 can be modified into various configurations as long as it performs cutoff of the electrical connection between the external terminal 32a and the electrode assembly through the lead 35 at a prescribed pressure level.

Each of the uncoated regions 11c, 12c of the positive and negative plates is arranged to project from the separator 13 so that the uncoated regions of the positive and negative plates may contact the positive collector plate 40 and the negative collector plate 50 corresponding thereto.

Figure 3A:
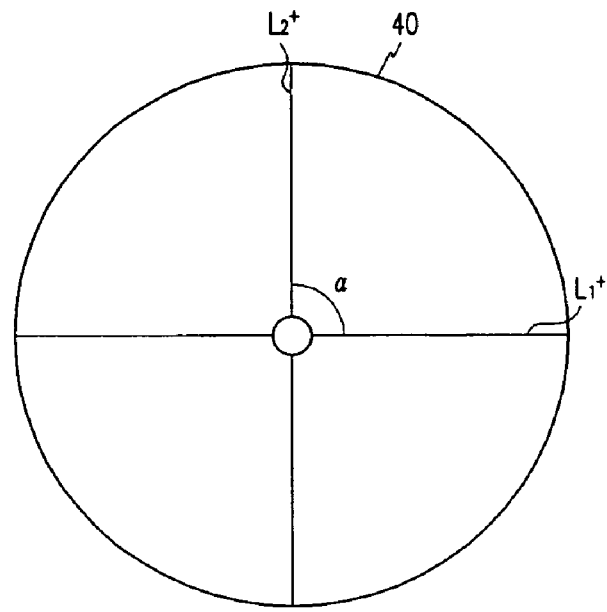
FIG. 3A and FIG. 3B are plan views of a positive collector plate and a negative collector plate, respectively, according to the embodiment of the present invention.
Figure 3B:
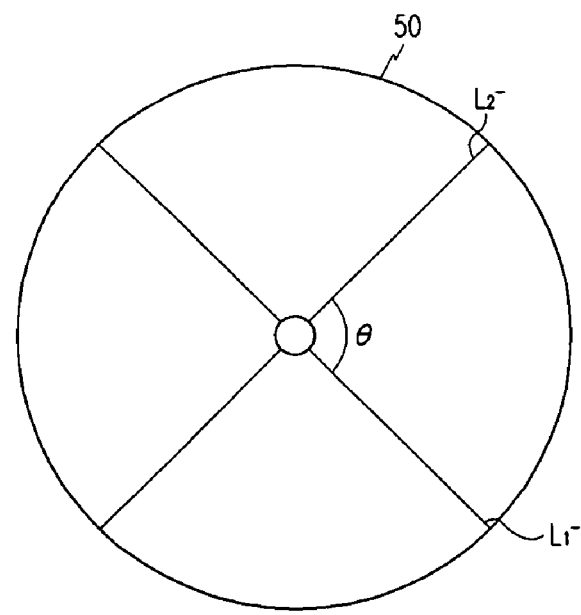

Each of the uncoated regions 11c, 12c is fixed to the corresponding collector plate 40, 50 by welding. Referring to FIGS. 3A and 3B, weld lines $L_1+$, $L_2+$, $L_1-$, $L_2-$ are formed on the positive and negative collector plates 40, 50, respectively.

In the exemplary embodiment of the present invention, each of the collector plates 40, 50 is made from a plate-shaped member which is coated with conductive material, and which has a round shape to fit the overall shape of the secondary battery. It is preferred that the thickness of the collector plates 40, 50 is two to three times thicker than that of the positive and negative plates 11, 12.

Furthermore, it is preferred that the uncoated regions 11c, 12c are fixed to the collector plates 40, 50 by laser welding. Since laser welding, unlike spot welding, can weld the collector plates 40, 50 to these uncoated regions 11c, 12c without pressure, it enables the collector plates 40, 50 to be fixed to the uncoated regions 11c, 12c without changing the shape of the uncoated regions 11c, 12c.

The following will describe in detail the weld structure of the uncoated regions 11c, 12c to the collector plates 40, 50.

After the electrode assembly 10 is prepared as above, the positive collector plate 40 and the negative collector plate 50 are contacted and welded to the corresponding uncoated regions 11c, 12c of the positive plate and the negative plate by laser welding.

Accordingly, as shown in FIG. 3A, a first pair of weld lines, $L_1+$, $L_2+$ are formed on the positive collector plate 40. As shown in FIG. 3B, a second pair of weld lines $L_1-$, $L_2-$ are formed on the negative collector plate 50.

It is preferable that each of the weld lines $L_1+$, $L_2+$, $L_1-$, $L_2-$ form a straight line passing the center of the corresponding collector plate 40, 50, and in the exemplary embodiment, the first weld lines $L_1+$, $L_2+$ are arranged in a cross shape on the positive collector plate 40 as are the second weld lines $L_1-$, $L_2-$ on the negative collector plate 50.

Each of angle ($\alpha$) between the first weld lines $L_1+$, $L_2+$, and angle ($\theta$) between the second weld lines $L_1-$, $L_2-$ is preferably 90 degrees, but angles ($\alpha$), ($\theta$) of the present invention are not limited to 90 degrees.

Figure 4:
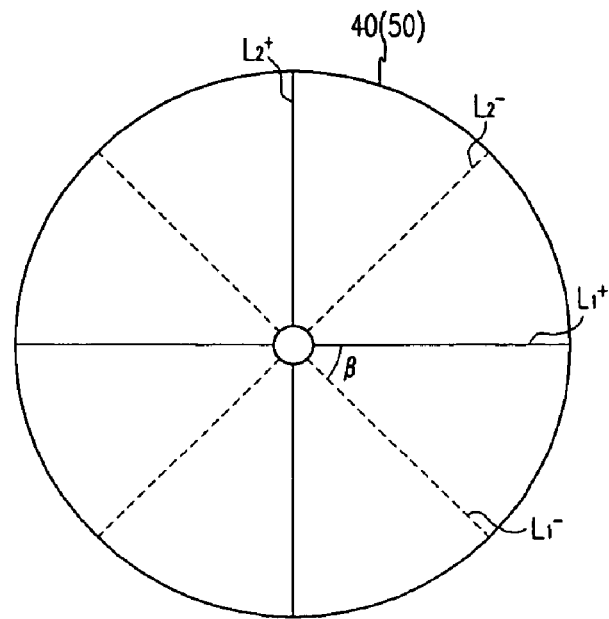
FIGS. 4 and 5 are plan views illustrating the structure for two different embodiments of positive collector plates and negative collector plates superimposed upon one another.

The first weld lines $L_1+$, $L_2+$ and the second weld lines $L_1-$, $L_2-$ are further arranged in an offset configuration on the collector plates 40, 50, as is best illustrated in FIG. 4. According to FIG. 4, the positive collector plate is superimposed over the negative collector plate so that the orientation of the first and second weld lines with respect to one another can be seen. In FIG. 4, the first weld lines $L_1+$, $L_2+$ and the second weld lines $L_1-$, $L_2-$ are offset from one another by an angle $\beta$.

In one embodiment, it is preferred that the angle β between the first weld lines $L_1+$, $L_2+$ and the adjacent second weld lines $L_1-$, $L_2-$ is between 10 and 80 degrees, and the angle for an exemplary embodiment is 45 degrees.

Along the weld lines $L_1+$, $L_2+$, $L_1-$, $L_2-$ which are arranged as set forth above, the uncoated regions 11c, 12c of the positive and negative plates contact the collector plates 40, 50. Each plate is welded and fixed to its corresponding positive collector plate through the weld lines $L_1+$, $L_2+$, and $L_1-$, $L_2-$.

Since the current collection from the positive and negative plates 11, 12 is achieved through the collector plates 40, 50, that are in electrical contact with and fixed to the uncoated regions 11c, 12c of the positive and negative plates, the internal resistance from the positive and the negative plates 11, 12 to the positive and negative terminals is decreased, thereby improving the power of the battery.

Furthermore, since the current collection structure is achieved by arranging the collector plates 40, 50 on the uncoated regions 11c, 12c and then laser welding them to the positive and negative plates, the efficiency of manufacturing the structure is improved.

Table 1 gives the test results for secondary batteries manufactured according to the present invention (referred to as the "Examples") and secondary batteries according to the conventional method of fixing lead tabs to the positive and negative plates (referred to as "Comparative Examples"). The tests were carried out by 100,000 charge/discharge cycles, and show the energy density for the Examples and Comparative Examples. As shown in table 1, the batteries according to the present invention have higher energy density than conventional batteries

TABLE 1

|   | Comparative Examples | Examples |
| --- | --- | --- |
| 1 | 1325 W/Kg | 1433 W/Kg |
| 2 | 1319 W/Kg | 1452 W/Kg |
| 3 | 1297 W/Kg | 1392 W/Kg |
| 4 | 1299 W/Kg | 1431 W/Kg |
| 5 | 1345 W/Kg | 1430 W/Kg |

According to the present invention, it is easier to weld the uncoated regions of the positive and negative plates to the collector plates. In addition, since the present invention enables the plural parts of the uncoated regions to be welded on one of the collector plates without a shape change, the collecting efficiency is increased to thereby improve the battery power.

The secondary battery of the present invention is useful as the power source for high power electric devices such as electric vehicles, hybrid electric vehicles, wireless vacuum cleaners, motorbikes, and motor scooters.

Figure 5:
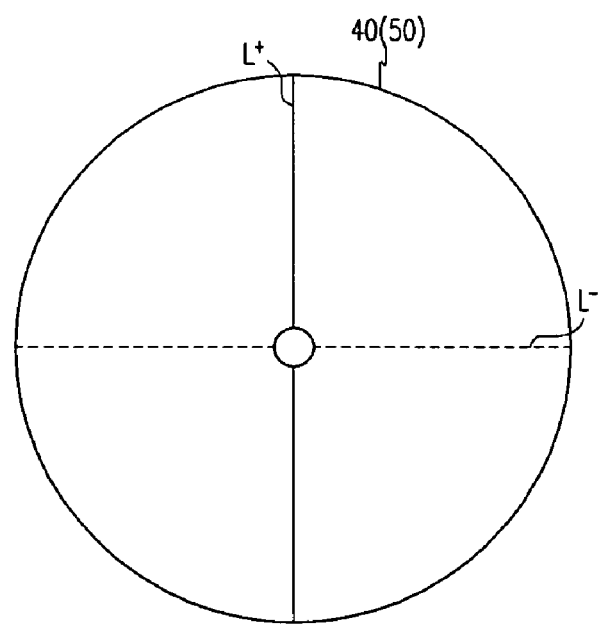

It should be noted that other embodiments of the invention are possible. For example, instead of using plural weld lines formed on each of the collector plates, as shown in FIG. 5, a single weld line can be formed on each of the collector plates 40, 50. For such an embodiment, the weld lines L+, L− are arranged in a cross shape with respect to one another with the two weld lines intersecting each other at a predetermined angle. In one embodiment, the predetermined angle is about 90 degrees.

Although various embodiments of the present invention have been shown and described, it should be appreciated by those skilled in the art that changes may be made to the disclosed embodiments without departing from the principles and spirit of the invention, the scope of which is defined in the claims and their equivalents.

What is claimed is:

1. A secondary battery comprising:
   positive and negative collector plates;
   a positive plate and a negative plate, each coated with an active material;
   a separator interposed between the positive plate and the negative plate
   a plurality of first weld lines arranged at angles with respect to one another on the positive collector plate for welding the positive collector plate to the positive plate; and
   a plurality of second weld lines arranged at angles with respect to one another on the negative collector plate for welding the negative collector plate to the negative plate, wherein the first weld lines and the second weld lines are offset from one another by about 90 degrees.

2. The secondary battery of claim 1, wherein the secondary battery is of a cylindrical shape.

3. The secondary battery of claim 2, wherein the collector plate is of a round shape.

4. The secondary battery of claim 1, wherein the weld lines are laser weld lines.

5. A secondary battery comprising:
   positive and negative collector plates;
   a positive plate and a negative plate, each coated with an active material;
   a separator interposed between the positive plate and the negative plate
   a plurality of first weld lines arranged at angles with respect to one another on the positive collector plate for welding the positive collector plate to the positive plate; and
   a plurality of second weld lines arranged at angles with respect to one another on the negative collector plate for welding the negative collector plate to the negative plate, wherein the first weld lines and the second weld lines are offset from one another by an offset angle from about 10 degrees to about 80 degrees.

6. The secondary battery of claim 5, wherein the offset angle is about 45 degrees.

7. A secondary battery comprising:
   positive and negative collector plates;
   a positive plate and a negative plate, each having an uncoated region which has not been coated with an active material;
   a separator interposed between the positive plate and the negative plate
   a positive weld line on the positive collector plate for welding the positive collector plate to the uncoated region of the positive plate; and
   a negative weld line on the negative collector plate for welding the negative collector plate to the uncoated region of the negative plate, wherein the positive and negative weld lines are offset from one another by about 90 degrees.

8. The secondary battery of claim 7 wherein the positive weld line is a first of a plurality of positive weld lines, the plurality of positive weld lines being placed on the positive collector plate at first angles from one another and the negative weld line is a first of a plurality of negative weld lines, the plurality of negative weld lines being placed on the negative collector plate at second angles from one another and the first angles and second angles are offset from one another.

9. The secondary battery of claim 7, wherein the secondary battery is of a cylindrical shape.

10. The secondary battery of claim 9, wherein the collector plate is of a round shape.

11. The secondary battery of claim 7, wherein the weld lines are laser weld lines.

12. A secondary battery comprising:
positive and negative collector plates;
a positive plate and a negative plate, each having an uncoated region which has not been coated with an active material;
a separator interposed between the positive plate and the negative plate
a positive weld line on the positive collector plate for welding the positive collector plate to the uncoated region of the positive plate; and
a negative weld line on the negative collector plate for welding the negative collector plate to the uncoated region of the negative plate, wherein the positive and negative weld lines are offset from one another by an offset angle of from about 10 degrees to about 80 degrees.

13. The secondary battery of claim 12, wherein the offset angle is about 45 degrees.

14. A secondary battery comprising:
positive and negative collector plates;
a positive plate and a negative plate, each coated with an active material;
a separator interposed between the positive plate and the negative plate
a plurality of first weld lines arranged at angles with respect to one another on the positive collector plate for welding the positive collector plate to the positive collector plate; and
a plurality of second weld lines arranged at angles with respect to one another on the negative collector plate for welding the negative collector plate to the negative collector plate wherein the first weld lines and the second weld lines are offset from one another by about 45 degrees.

15. The secondary battery of claim 14 comprising two first weld lines and two second weld lines.

16. The secondary battery of claim 15 wherein the first two weld lines are oriented at about right angles to one another and the second two weld lines are oriented at about right angles to one another.

17. The secondary battery of claim 14, wherein the weld lines are laser weld lines.

18. The secondary battery of claim 14 wherein each of the positive and the negative plates includes an uncoated portion that is not coated with active material and the positive and negative collector plates are welded to the uncoated portions of the positive and negative plates, respectively.

19. A secondary battery comprising:
positive and negative collector plates;
a positive plate and a negative plate, each coated with an active material;
a separator interposed between the positive plate and the negative plate
a plurality of first weld lines arranged at angles with respect to one another on the positive collector plate for welding the positive collector plate to the positive collector plate; and
a plurality of second weld lines arranged at angles with respect to one another on the negative collector plate for welding the negative collector plate to the negative collector plate, wherein the first weld lines and the second weld lines are offset from one another by an offset angle from about 10 degrees to about 80 degrees.

* * * * *

UNITED STATES PATENT AND TRADEMARK OFFICE
CERTIFICATE OF CORRECTION

PATENT NO.         : 7,794,872 B2                          Page 1 of 1
APPLICATION NO.    : 11/036933
DATED              : September 14, 2010
INVENTOR(S)        : Yong-Sam Kim It is certified that error appears in the above-identified patent and that said Letters Patent is hereby corrected as shown below:

In the Claims

| | |
|---|---|
| Column 6, Claim 1, line 10 | After "plate" Insert -- ; -- |
| Column 6, Claim 5, line 30 | After "plate" Insert -- ; -- |
| Column 6, Claim 7, line 48 | After "plate" Insert -- ; -- |
| Column 7, Claim 12, line 11 | After "plate" Insert -- ; -- |
| Column 7, Claim 14, line 28 | After "plate" Insert -- ; -- |
| Column 8, Claim 19, line 23 | After "plate" Insert -- ; -- |

Signed and Sealed this
Seventh Day of February, 2012

David J. Kappos
*Director of the United States Patent and Trademark Office*